NON-LINEAR REACTANCE CHROMINANCE SIGNAL DEMODULATORS

Filed Dec. 20, 1956 5 Sheets-Sheet 1

INVENTORS
RICHARD W. SONNENFELDT
GUSTAVE L. GRUNDMANN
& MICHAEL COOPERMAN

BY

[signature]
ATTORNEY

NON-LINEAR REACTANCE CHROMINANCE SIGNAL DEMODULATORS

Filed Dec. 20, 1956 5 Sheets-Sheet 2

INVENTORS
RICHARD W. SONNENFELDT
GUSTAVE L. GRUNDMANN
& MICHAEL COOPERMAN
BY
[signature]
ATTORNEY INVENTORS
RICHARD W. SONNENFELDT
GUSTAVE L. GRUNDMANN
& MICHAEL COOPERMAN
BY
ATTORNEY INVENTORS
RICHARD W. SONNENFELDT
GUSTAVE L. GRUNDMANN
& MICHAEL COOPERMAN
BY
[signature]
ATTORNEY Aug. 11, 1959 R. W. SONNENFELDT ET AL 2,899,491

NON-LINEAR REACTANCE CHROMINANCE SIGNAL DEMODULATORS

Filed Dec. 20, 1956 5 Sheets-Sheet 5

INVENTORS
RICHARD W. SONNENFELDT
GUSTAVE L. GRUNDMANN
BY & MICHAEL COOPERMAN

ATTORNEY

United States Patent Office 2,899,491

Patented Aug. 11, 1959

2,899,491

NON-LINEAR REACTANCE CHROMINANCE SIGNAL DEMODULATORS

Richard W. Sonnenfeldt, Haddonfield, Gustave L. Grundmann, Westmont, and Michael Cooperman, Barrington, N.J., assignors to Radio Corporation of America, a corporation of Delaware Application December 20, 1956, Serial No. 629,733

28 Claims. (Cl. 178—5.4)

The present invention relates to improved synchonous demodulator devices and more particularly to a novel non-linear reactance type of synchronous demodulator for demodulating color difference signal information from a chrominance signal.

The present color television signal includes a luminance signal which represents brightness information and also a chrominance signal. The chrominance signal is a modulated subcarrier whose sidebands represent a wide gamut of color difference signal information. Different color difference signals are included at different phases of the chrominance signal with the amplitude of the chrominance signal at each phase being indicative of the saturation of the corresponding color difference signal occurring at that phase (when considered in combination with the brightness information in the luminance signal).

The color difference signals represent information describing how each component color in the televised scene differs from the color content of the luminance information representing that televised scene. Information relating to a transmitted color image is formed by a combination of color information derived from red, green, and blue color information of the image to be televised; the luminance signal is formed with proportions of red, green, and blue color information according to the ratio .33:.59:.11. Red, green, and blue color difference signals, that is, $R-Y$, $G-Y$, and $B-Y$ signals, when individually added to the luminance or Y signal, will provide the component color signals R, G, and B which describe the televised scene.

In the color television signal, the luminance information has a bandwidth from substantially 0–4.2 mcs. The chrominance signal, transmitted at a mean carrier frequency of 3.58 mcs., has a bandwidth of from approximately 2 to 4.2 mcs.

A plurality of desired color difference signals may be demodulated from the chrominance signal by synchronous detection, that is, by beating or mixing the chrominance signal with each of a corresponding plurality of demodulating signals having the frequency of the chrominance signal and having phases corresponding to the phases in the chrominance signal at which the desired color difference signal information occurs. In any color television receiver circuit at a point remote from a broadcast transmitter, it is therefore necessary that accurately phased synchronous demodulating signals be generated. In order to make the generation of these synchronous demodulating signals possible, bursts of reference phase information having the frequency of the chrominance signal are transmitted on the "back porch" of the horizontal synchronizing pulse which occurs during each blanking interval.

Heretofore, synchronous detection has been accomplished in electron tube, transistor, and rectifier circuits wherein the aforementioned functions of beating or mixing of the synchronous demodulating signals and the chrominance signal may be accomplished. Synchronous demodulator circuits of the well-known variety are described, for example, by Pritchard and Rhodes in their article entitled "Color Television Receiver Signal Demodulators" as published in the June 1953 issue of the RCA Review.

The specification to follow will describe a different and improved type of synchronous demodulator device of the present invention using a controllable non-linear reactance; the latter-mentioned synchronous demodulator device is particularly useful in color television receivers and synchronous demodulator circuits, for synchronously demodulating one or more color difference signals from a chrominance signal with the advantages of circuit stability, small physical size, carefully controlled signal amplitude levels, and accuracy of operation.

It is therefore an object of the invention to provide a simplified and improved synchronous demodulator.

It is a further object of the invention to provide a means for demodulating a plurality of color difference signals from a chrominance signal wherein the ratio of the amplitude levels of the various demodulated color difference signals is maintained substantially constant.

It is a further object of the invention to provide a color demodulator device of small size and multiple operation which does not utilize filaments or cathodes.

According to the invention the chrominance signal and one or more demodulating signals are mixed in a synchronous demodulating device consisting of a reactance having a symmetrical non-linear characteristic relationship between the reactance of the device and a voltage applied to or a current passed through the device.

A typical non-linear reactance of the present invention, forming a non-linear magnetic demodulator, is a high-$\mu$ iron core having an input winding to which the signal to be demodulated is applied, one or more output windings, and a demodulating winding to which a demodulating signal is applied. A non-linear relationship exists between the flux passing through the high-$\mu$ iron core and the ampere turns produced by the current passing through both the input and demodulating signal winding. The non-linear magnetic demodulator, therefore, produces differentiated demodulated signals in the output windings; by either integrating the signal to be demodulated before it is applied to the input circuit or by integrating the differentiated demodulated signal developed in the output windings, the desired demodulated signal output is produced.

In another form of the invention, the nonlinear reactance consists of a nonlinear capacitance across which the chrominance signal and the demodulating signal are applied, with the capacitance of the nonlinear capacitance varied in accordance with the demodulating signal.

Demodulator devices of the present invention are particularly useful for providing a plurality of color difference signals from a chrominance signal. For example, a nonlinear magnetic demodulator device having a plurality of flux paths, and arranged to provide control of the flux and reactance of each path responsive to a demodulating signal of selected phase, will develop different polarities and magnitudes of a demodulated color difference signal across a number of output windings, each winding having a prescribed number of turns and direction of winding.

Output windings of different nonlinear magnetic demodulators may be coupled together to combine selected polarities and amplitudes of the various demodulated color difference signals to form color difference signals corresponding to phases in the chrominance signal other than those phases used by the demodulating signals applied to the nonlinear magnetic demodulator devices.

A synchronous demodulating device of the present invention may also consist of a nonlinear capacitance having a plurality of portions, each capable of controllable capacitance responsive to a demodulating-signal-varying electric field developed across those portions of the nonlinear capacitance, with the corresponding color difference signal derived therefrom.

Other and incidental objects will become apparent on the reading of the following specification and a study of the drawings where:

Figures 7, 9, 12:
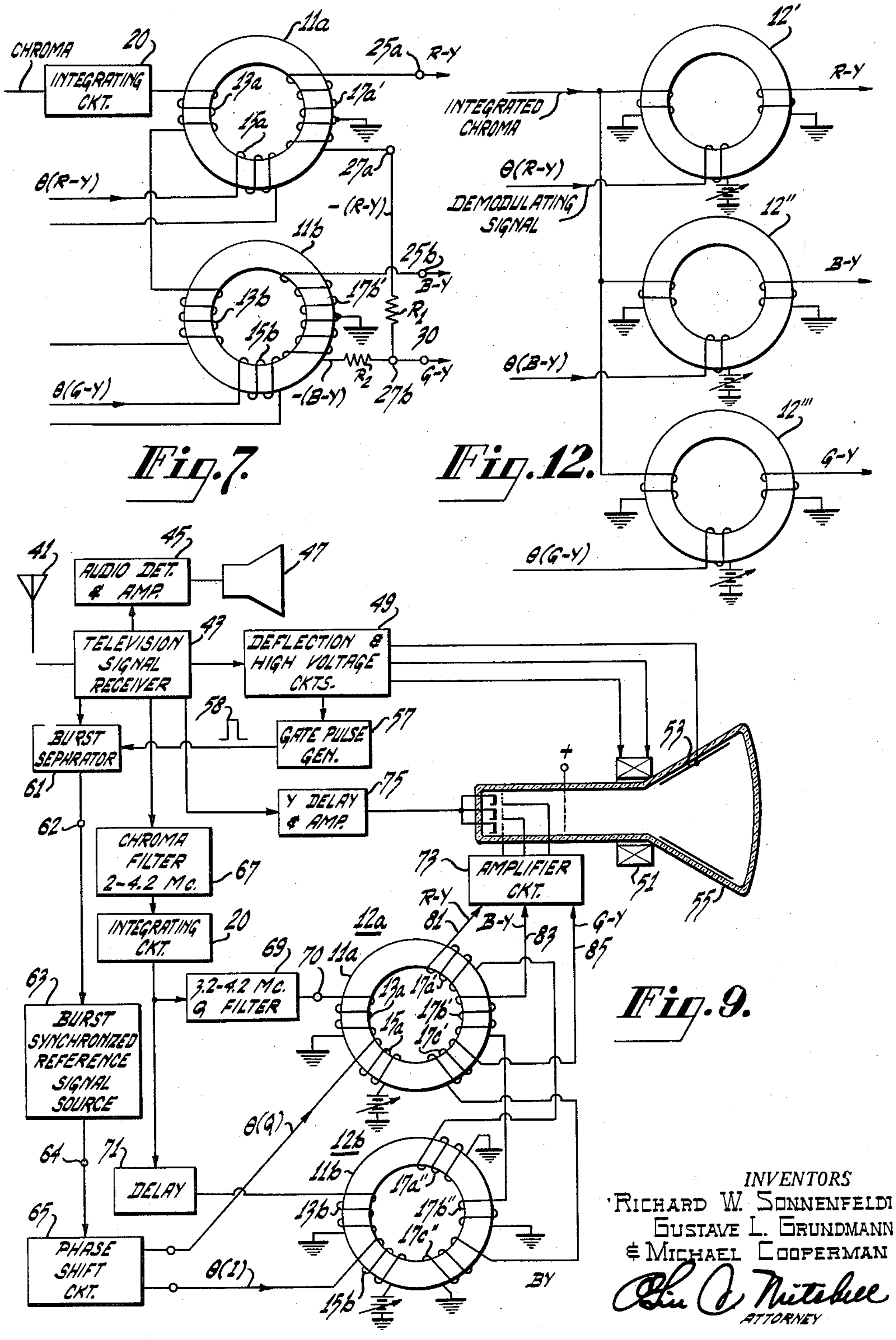
Figure 9 is a block diagram of a color television receiver utilizing a pair of nonlinear magnetic demodulators of the present invention as color demodulators.
Figure 10:
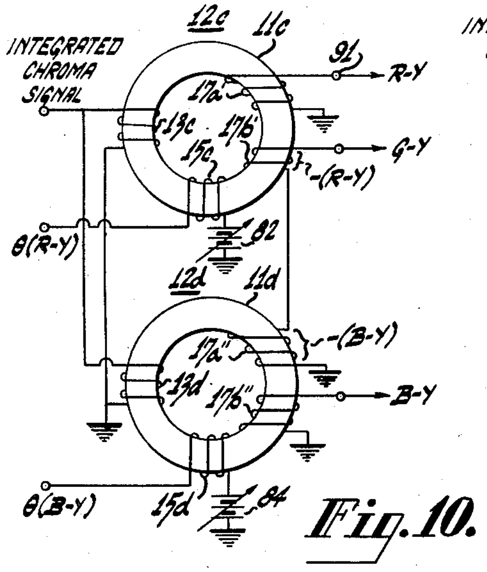
Figure 11:
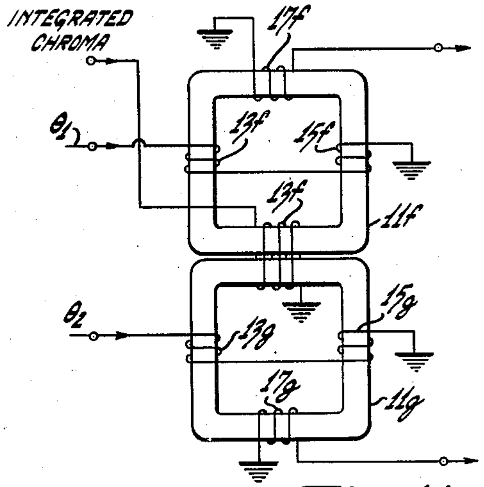
Figure 13A:
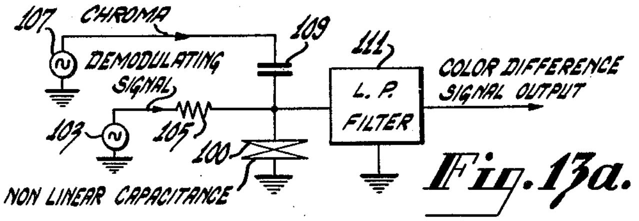
Figure 13B:
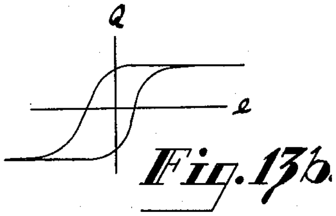
Figure 14:
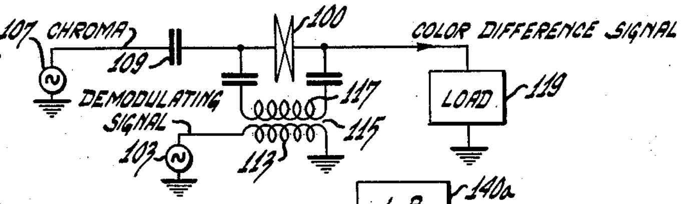
Figure 15:
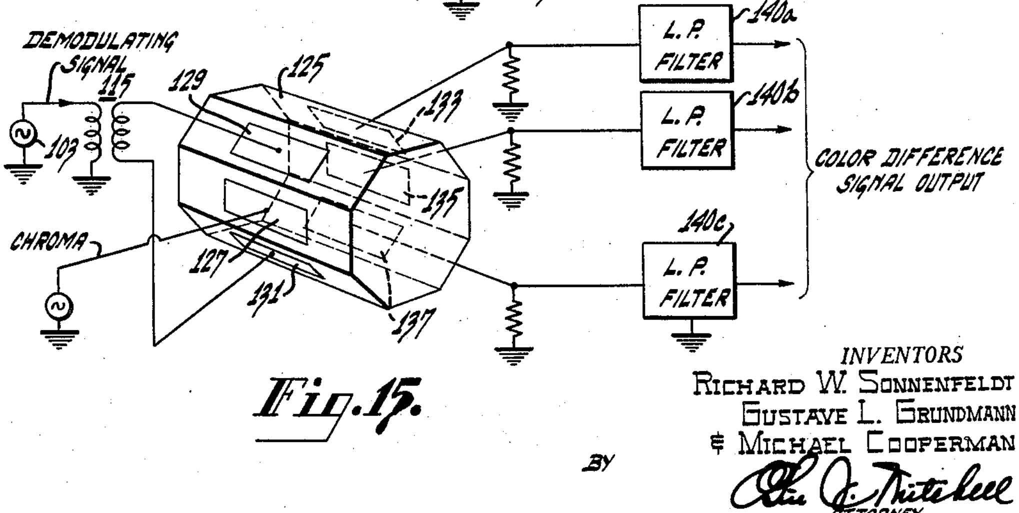
Figure 16:
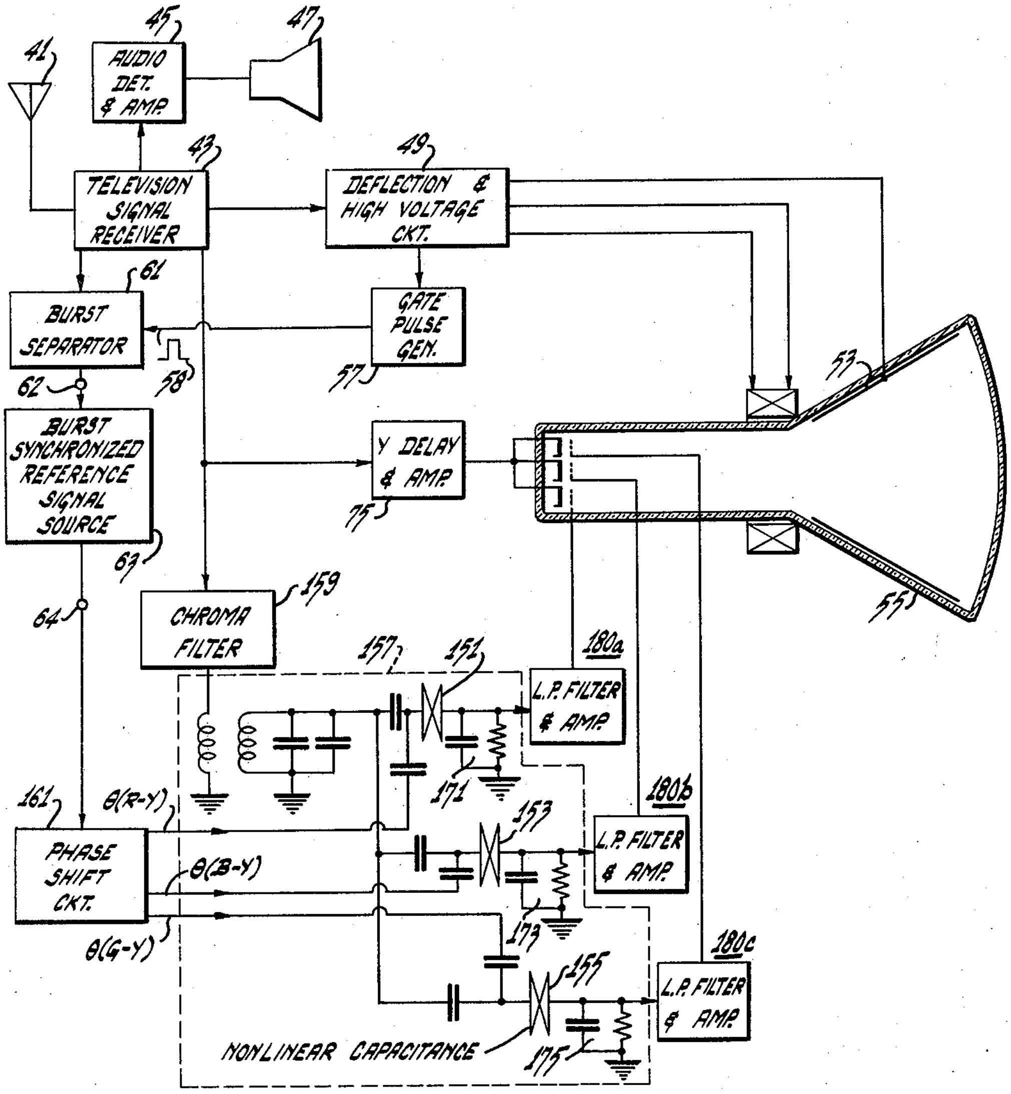
Figure 17:
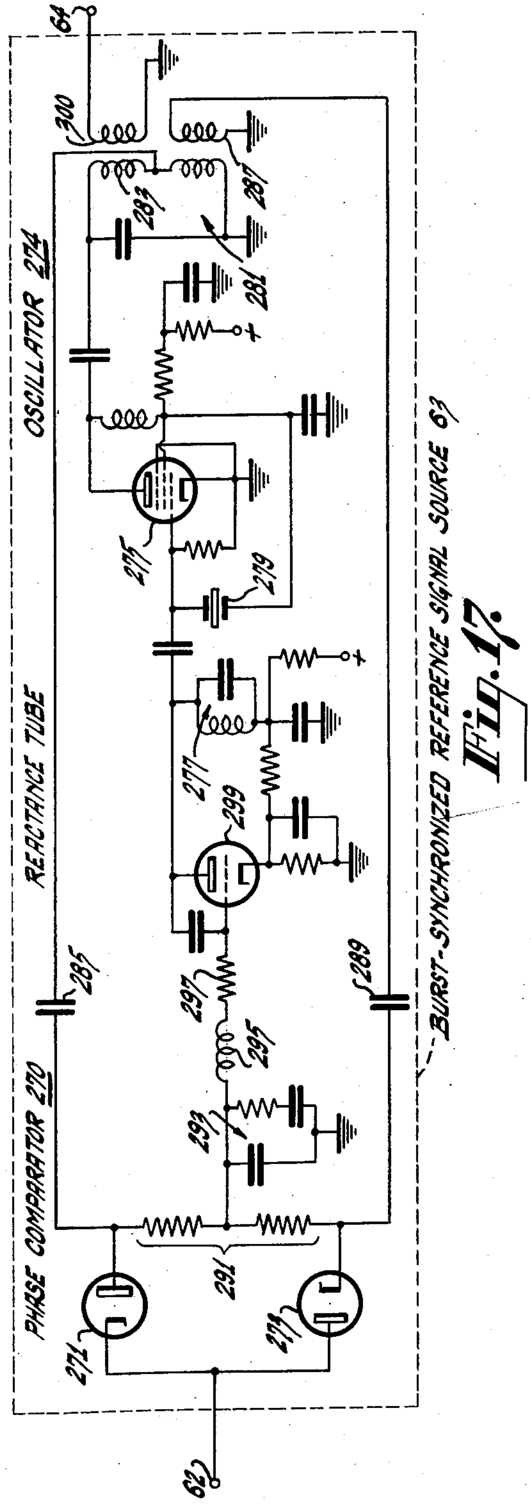
Figure 18:
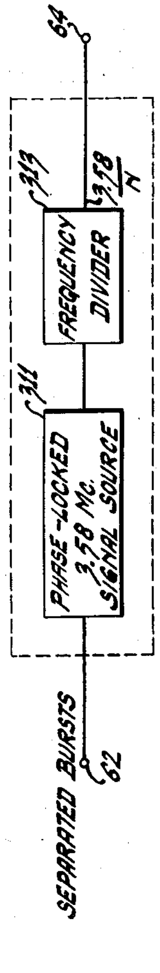

Figures 10, 11, and 12 show other circuits including a plurality of nonlinear magnetic demodulators to produce a plurality of color difference signals from a chrominance signal;

Figures 13A and 14 are circuit diagrams of the demodulator circuits using nonlinear capacitances;

Figure 13B is a diagram of a characteristic curve relating the charge as a function of applied voltage of a nonlinear capacitance;

Figure 15 is a diagram of a block of nonlinear capacitance material which is adapted to produce a plurality of color difference signals; and Figure 16 is a block diagram of a color television receiver which uses a trio of nonlinear capacitance demodulators; and Figures 17 and 18 are diagrams of reference signal sources.

*A nonlinear reactance demodulator*

Figure 1:
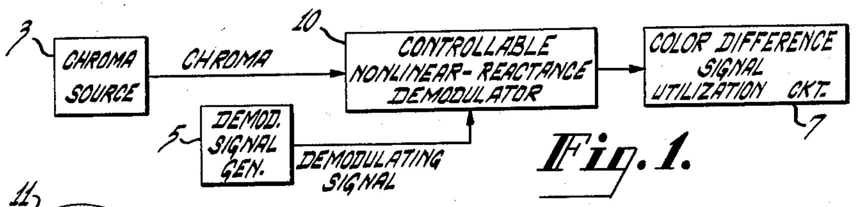
Figure 1 is a block diagram of one form of the invention in a more general form.

Figure 1 is a diagram of a controllable nonlinear reactance demodulator 10, representing the present invention. The chrominance signal, hereinafter referred to as chroma, and the demodulating signal are applied to the controllable nonlinear reactance demodulator 10 from the chroma source 3 and the demodulating signal generator 5, respectively; the circuit of the invention develops a color difference signal corresponding to information contained at the phase of the demodulating signal in the chrominance signal. This output signal is applied to a color difference signal utilization circuit 7. The controllable nonlinear reactance demodulator 10, whose various forms and arrangements will be described later in this specification, is characterized by a symmetrical nonlinear relationship between the reactance of the device and the magnitude of a driving force such as a voltage or current.

A further understanding of the nature of a nonlinear reactance of the type used in the present invention may be had by considering the difference between a linear reactance and a nonlinear reactance. A reactance is defined as $\omega L$ in the case of an inductance L, $\omega M$ in the case of mutual inductance M, or $1/\omega C$ in the case of a capacitance C. A linear reactance is a reactance whose values of L, M, or C do not change with changes in the magnitude of an applied current or voltage; such as a reactance is a function only of the fixed magnitudes of L, M, or C, and of the frequency. A nonlinear reactance, on the other hand, is one wherein the values of L, M, or C are not fixed but are a function of the magnitude of an applied voltage or current.

In one form of the invention, the nonlinear reactance portion of the present invention takes the form of a nonlinear inductance wherein the flux or induction of a material of the inductance varies nonlinearly with the intensity of a current applied through one or more windings of the inductance.

Another form of nonlinear reactance consists of a nonlinear capacitance, such as ceramic barium titanate, whose capacitance can be varied by varying the magnitude of a suitable electric field across the nonlinear capacitance along the ferro-electric axis of that nonlinear capacitance.

A controllable nonlinear reactance demodulator 10 of the present invention has a distinct advantage over nonlinear resistance demodulators such as diode, rectifier, and electron tube demodulator devices of the types described, for example, in the aforementioned article by Pritchard and Rhodes, inasmuch as no filaments or cathodes are required. Also, the nonlinear magnetic demodulators having a plurality of output windings will have a fixed ratio between the relative amplitudes of the demodulated signals developed across the output windings in virtue of the fact that the turns-ratios will not be changed during operation of the demodulations.

*Nonlinear magnetic demodulators*

Figures 2, 3, 4, 5:
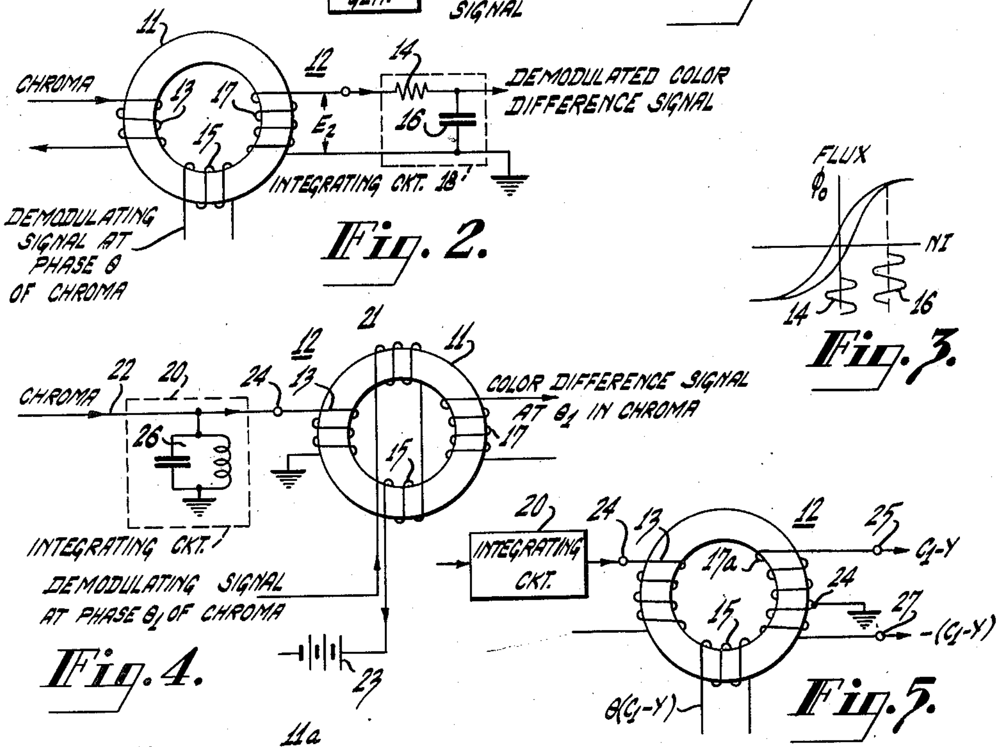
Figures 2 and 4–7 show nonlinear magnetic demodulators of the present invention.
Figure 3 is a diagram relating current and flux which is characteristic of the nonlinear magnetic demodulators of Figures 2 and 4–7.

Figure 2 is a diagram of one form of nonlinear magnetic demodulator. This nonlinear magnetic demodulator utilizes a high-$\mu$ magnetic core 11 on which are wound a trio of windings; namely, an input winding 13, an output winding 17, and a demodulating signal winding 15. A demodulating signal having a phase related to the phase $\theta_1$ of the chroma is applied to a demodulating signal winding 15.

For reasons to be discussed in detail, the nonlinear magnetic demodulator will develop a time-differentiated demodulated signal in the output winding 17 from a chroma-type of signal applied to the input winding 13. The nonlinear magnetic demodulator is therefore capable of being operated in either of two forms of circuits of the present invention.

In one form of the invention, an integrated chrominance signal is applied to the input winding 13; the color difference signal information at the phase $\theta_1$ in the chrominance signal will be developed in the output winding 17. In another form of the invention, a chrominance signal applied to the input winding 13 will produce the time derivative of the color difference signal information at the phase $\theta_1$ in the chrominance signal; in the output winding 17 an integrating circuit coupled to the output winding 17 will transform the time derivative of the color difference signal to that color difference signal.

The operation of the nonlinear magnetic demodulator of Figure 2 may be understood by an inspection of the flux current diagram of Figure 3. As is seen in the diagram of Figure 3, the relationship between the flux $\phi$ through the high-$\mu$ iron core 11 and the total ampere turns NI of the core is a hysteresis diagram. When the total ampere turns through the high-$\mu$ iron core 11 increases beyond a certain value of ampere turns, then the flux $\phi$ in the high-$\mu$ iron core 11 will cease increasing; the flux $\phi_0$ of the high-$\mu$ magnetic core 11 is seen to bear a nonlinear relationship with respect to the total ampere turns to the high-$\mu$ iron core 11.

*Theory of the nonlinear magnetic demodulator*

The nonlinear magnetic demodulator of Figure 2 has an input winding 13 and an output winding 17 and a demodulating signal winding 15; the flux $\phi_0$ in the core, which links the output winding 17 and is responsive to a current $i_1$ in the input winding 13 of turns $N_1$ and the current $i_2$ in the demodulating signal winding 15 of turns $N_2$, is expressed by the relationship $$\phi_0=A_0+A_1(NI)+A_2(NI)^2+A_3+(NI)^3+ \ldots \quad (1)$$

where NI is the total ampere turns produced by the currents $i_1$ and $i_2$ in windings 13 and 15, respectively; $A_1$, $A_2$ are constants and $$NI=N_1i_1+N_2i_2 \quad (2)$$

The output voltage $e_0$ induced in the output winding 17 is, therefore letting $No$ be the number of turns in the output winding 17, $$e_0=No\frac{d\phi_0}{dt} \quad (3)$$

where $\phi_0$ is described by Equation 1.

It is evident from Equation 2 that, in general, the output voltage $e_2$ is the time derivative of the signal represented by the flux $\phi_0$ due to the variation of the total current I. If the current I is representative of information derived from both the chrominance signal and the demodulating signal, then the flux $\phi$ and not the output voltage $e_2$ will have a component which is truly indicative of a demodulated color difference signal related to the phase of the demodulated color difference signal.

In order that the voltage developed by the output winding be a true representation of a demodulated color difference signal rather than its derivative, either the chrominance signal information applied to the input winding 13 must be integrated prior to being applied to the last-named winding, or else the demodulated color difference signal information at the output winding 17 must be integrated. In the mathematical description to follow, the synchronous demodulation process will be further described in terms of flux $\phi_0$ rather than output voltage $e_0$; however, it is to be understood that, if the chrominance signal is integrated prior to being applied to the input winding 13 or if the voltage developed at the output winding 15 is to be integrated, the expression for the flux $\phi_0$ will also describe the signals developed by the nonlinear magnetic demodulator operating in combination with a demodulator circuit.

The two circuits $i_1$ and $i_2$ applied respectively to the high-$\mu$ iron core 11 by way of the input winding 13 and the demodulating signal winding 15 produce the flux linking the output winding 17, which may be expressed as a function of these two currents as $$\phi_0=A_0+A_1(N_1i_1+N_2i_2)+A_2(N_1i_1+N_2i_2)^2+\ldots \quad (4)$$

where $N_1i_1$ and $N_2i_2$ are the ampere turns of the input winding 13 and the demodulating signal winding 15, respectively. It is noted that neither $i_1$ nor $i_2$ contain direct-current terms, and that the even-power terms in the expression of Equation 3 vanish or are very small (since the hysteresis curve of the high-$\mu$ iron core is symmetrical).

Consider the case when a chrominance signal is demodulated by a demodulating signal having the color subcarrier frequency $\omega_c$ in a nonlinear magnetic demodulator of the present invention.

Let the chrominance signal or chroma be expressible by the relationship $$i_1=I(t)\cos[\omega_ct+\theta(t)] \quad (5)$$

and let the demodulating signal be expressible as $$i_2=K\cos\omega_ct \quad (6)$$

Then the flux $\phi_0$ becomes $$\phi_0=A_1[N_1I(t)\cos(\omega_ct+\theta(t))+N_2K\cos\omega_ct]+A_2[N_1^2I^2(t)(\tfrac{1}{2}+\tfrac{1}{2}(\cos(2\omega_ct+2\theta(t)))+N^2K^2(\tfrac{1}{2}+\tfrac{1}{2}\cos2\omega_ct)+2N_1N_2KI(t)\cdot\cos(\omega_ct+\theta(t))\cos\omega_ct]+\ldots \quad (7)$$

If information relating to all terms of the frequency $\omega_c$ and higher are removed by a low-pass filter or a similar device, there remains only the second order term.

$$\phi_{0LP}=+\frac{A_2}{1}[(N_1I(t))^2+(N_2K)^2+2N_1N_2KI(t)\cos\theta(t)] \quad (8)$$

The first term in the bracket of Equation 8 describes the square of the envelope of the chrominance signal; the second term is a constant; the third and final term in the bracket of Equation 8 represents the demodulated color difference signal. In order that the color difference signal be of much larger magnitude than the information representing the squared envelope, it is necessary that $$N_2K>>N_1I(t) \quad (9)$$

However, if the demodulating signal is applied to the nonlinear magnetic demodulator in a range of a curve of the flux versus ampere turns that is symmetrical relative to the quiescent point of the oscillation of the demodulating signal (for example, where $NI=0$ in Fig. 3), the second order term will disappear and no demodulation will occur. If the quiescent point of the demodulating signal is adjusted to a point of the curve in Figure 3 where the excursions in both polarity of the demodulating signal are along a portion of the curve which is not symmetrical with respect to the quiescent point ($NI=0$), then the second order term of Equation 7 is not zero and synchronous demodulation takes place.

Consider the case when a demodulating signal having a frequency equal to one-half the color subcarrier frequency is used; i.e., $$i_1=I(t)\cos[\omega_ct+\theta(t)] \quad (10)$$

$$i_2=A\cos\tfrac{1}{2}\omega_ct) \quad (11)$$

Synchronous detection will be provided by components yielded by only the third order term in the time variation of the flux $\phi_0$; i.e., $$A_3[(N_1i_1)^3+3(N_1i_1)^2N_2i_2+3(N_1i_1)(N_2i_2)^2+(N_2i_2)^3] \quad (12)$$

The low frequency component represented by the third term in this bracket is entirely due to the term $$3N_1i_1(N_2i_2)^2 \quad (13)$$

which, in terms, of $i_1$ and $i_2$ as expressed by Equations 10 and 11, respectively, yields $$3N_1N_2^2K^2I(t)[\cos(\omega_ct+\theta(t))(\tfrac{1}{2}+\tfrac{1}{2}\cos\omega_ct)] \quad (14)$$

The low frequency component yielded by the above expression is therefore $$\tfrac{3}{4}A_3N_1N_2^2K^2I(t)\cos\theta(t) \quad (15)$$

where $I(t)\cos\theta(t)$ is the desired color difference signal.

*Harmonic and sub-harmonic synchronous demodulation in nonlinear magnetic demodulators*

The mathematic derivations of the preceding section have shown very important characteristics of nonlinear magnetic demodulators. These characteristics are listed as follows:

(A) Synchronous demodulation cannot be accomplished in a nonlinear magnetic demodulator where the frequency of the demodulating signal is the frequency of the chrominance subcarrier for the case where the demodulating signal represents a sinusoidal variation of the form 14 shown in Figure 3. This demodulating signal varies about the central axis of the flux $\phi$ vs. current characteristic curve. This failure to synchronously demodulate arises from the fact that the characteristic relating to the flux $\phi_0$ and the current (or the magnetic induction of the iron core 11 to the total magnetomotive force controlling the magnetic induction) is symmetrical with respect to the quiescent point of the demodulating signal.

(B) When the demodulating signal is superimposed on a bias current, say, $i_k$, as illustrated by the curve 16 in Figure 3, then the nonsymmetrical nonlinearity of the characteristic curve in that region will provide for synchronous detection of color difference signal information from the chrominance signal, using a demodulating signal having the frequency of the chrominance subcarrier.

(C) When the demodulating signal has a frequency which is one-half the frequency of the chrominance signal color subcarrier, interaction of the chrominance signal and the demodulating signal, in virtue of the third power term of the Equation 7, will provide synchronous demodulation at a phase of the chrominance signal which corresponds to the phase of a half-frequency demodulating signal. It has been found in practice that demodulation using the above-mentioned half-frequency demodulating signal leads to no reduction in demodulation efficiency but actually provides a demodulating signal of reduced distortion.

(D) It can be further shown from the preceding derivation that, when a demodulating signal having the frequency $\omega_c/3$ is used, then the fourth power term of Equation 7 will provide components which correspond to demodulated color difference signal information. In like fashion, if a demodulating signal having the frequency $\omega_c/4$ is used, then a fifth power term of Equation 7 will contain components which are indicative of demodulating color difference signal information.

(E) In the specification to follow, the demodulating signal will be understood to be a signal having either the frequency of the chrominance signal subcarrier, at which point a bias current source will be used, or a demodulating signal having a subharmonic frequency of the chrominance signal subcarrier frequency. A demodulating signal capable of demodulating color difference signal information from a particular phase in the chrominance signal will be understood to have its phase identified in terms of the phase of the chrominance signal at which the color difference signal information to be demodulated occurs and not in terms of the actual phase of the demodulating signal, since this actual phase may be different. For example, if a pair of demodulating signals of half frequency are applied to a pair of nonlinear magnetic demodulators and if these half-frequency demodulating signals have an actual phase difference of 45°, color difference signals separated in phase by 90° in the chrominance signal will be demodulated. The two half-frequency demodulating signals may thereupon be identified as demodulating signals capable of demodulating signal information separated at 90° in phase in the chrominance signal without the need of referring to the 45° separation between these half-frequency demodulating signals which actually exists.

(F) The operation of the nonlinear magnetic demodulator 12 may be understood in terms of the behavior of the permeability of the high-$\mu$ iron core, responsive to current passed through the demodulating signal winding 15. The demodulating signal will cause the permeability of the high-$\mu$ iron core 11 to vary in accordance with the demodulating signal; the attendant variation of permeability will change the inductance of the input winding 13. Signal information relating to the chrominance signal, which is applied to the input winding, will be mixed with information relating to the demodulating signal in virtue of the time-varying variation of the permeability; to provide for demodulation of signal information related to the color difference signal corresponding to the phase of the demodulating signal, the last-named signal information relating to the color difference signal is thereupon caused to be developed in the output winding 17 although this signal information could also be derived directly from the input winding 13.

*Nonlinear magnetic demodulator circuits*

The integrating circuit 18, which is coupled to the output winding 17 in Figure 2, is shown as a schematic diagram in a dash-line box; the schematic diagram is of a typical, though not necessarily preferred, circuit which functions as an integrating circuit.

The integrating circuit 18 includes a resistor 14 and a condenser 16; the condenser 16 acts as the integrating element and the resistor 14 functions as time-constant determining element. The time-constant of the resistor 14 and the condenser 16 is designed such that the voltage developed across the condenser 16 is a suitable integrated version of the voltage developed across the output winding 17 and will have a frequency response commensurate with the frequency range of the demodulated signal information; this integrated version of the voltage developed across the output winding 17 is the color difference signal information occurring in the chrominance signal at the phase of the demodulating signal.

Figure 4 is a diagram of an alternative form of nonlinear magnetic demodulator of the present invention which includes the input winding 13, the demodulating signal winding 15, and an output winding 17, all wound on a high-$\mu$ magnetic core 11. The nonlinear magnetic demodulator also includes a fourth winding, namely, a bucking winding 21 which is in series with the demodulating signal input winding and is wound in such a direction that the demodulating signal which is used to vary the characteristics of the high-$\mu$ magnetic core 11, is prevented from being developed in either the input signal winding 13 or the output winding 17.

The nonlinear magnetic demodulator shown in Figure 4 can be operated, with or without the bucking winding 21, in an alternative mode of operation by utilizing a battery 23 which is connected in series with the demodulating signal winding 15 and the bucking winding 21. The potential of the battery 23 is chosen to provide a current through both the demodulating signal winding 15 and the bucking winding 21 so that the high-$\mu$ magnetic core 11 is caused to be saturated or nearly saturated.

In the circuit of Figure 4, an integrating circuit 20 is coupled between the line 22 which supplies the chrominance signal, or chroma, and the input terminal 24 of the input winding 13 of the high-$\mu$ iron core 11. The integrating circuit of Figure 4 is assigned the numeral 20 to distinguish it from the integrating circuit 18 of Figure 2, which is coupled to the output winding 17.

The integrating circuit 20 of Figure 4 is a simple and effective circuit which consists of a shunt-connected parallel resonant circuit 26. The parallel resonant circuit 26 is sharply resonant at the chroma subcarrier frequency and integrates the chrominance signal by accentuating the amplitude of the chroma components in the vicinity of the chroma subcarrier; deaccentuation of the amplitude of chroma components is provided for those chroma components at frequencies having large frequency separation from the chroma subcarrier frequency.

While nonlinear magnetic demodulators function correctly with an integrating circuit at either the input or output windings, maximum simplicity is achieved in chrominance signal circuits where a plurality of nonlinear magnetic demodulators are used, by employing a single integrating circuit at a common input point to each of these nonlinear magnetic demodulators.

The demodulating signal, which is applied to the demodulating signal winding 15 and the bucking winding 21, desaturates the high-$\mu$ metal core 11 during peak values of one polarity of a half cycle of the demodulating signal thereby causing chrominance signal information applied to the input winding 13 to be translated to the output winding 17 only during the brief periods of desaturation. In this way the nonlinear magnetic demodulator of Figure 4, using the potential source 23 in combination with at least the demodulating signal winding 15, will cause the nonlinear magnetic demodulator circuit to act as a sampler circuit which will sample the chroma. Color information occurring during prescribed intervals of the envelope of the chroma, at a phase and timing determined by the phase of the demodulating signal will be developed in the output winding 17.

Figure 5 is a diagram of a nonlinear magnetic demodulator having an input winding 13 and a demodulating signal winding 15; the output winding 17a is center tapped to ground. The chrominance signal is applied through the integrating circuit 20 to the input winding 13. If the demodulating signal applied to the demodulating signal winding 15 has a phase corresponding to the phase $\theta(C_1-Y)$ of the chrominance signal, the nonlinear magnetic demodulator 12 will develop a $C_1-Y$ color difference signal at the terminal 25 at one end of the output winding 17*a* and a $-(C_1-Y)$ color difference signal at the terminal 27 at the other end of the output winding 17*a*.

It therefore follows that a nonlinear magnetic demodulator 12 of the present invention using an output winding of the type shown in Figure 5 will develop both positive and negative polarities of a demodulating color difference signal. A nonlinear magnetic demodulator 12 of the type shown in Figure 5 has the additional advantage in that the number of windings on a high-$\mu$ magnetic core will not change, thereby fixing a turns ratio and therefore the voltage ratio between the number of turns between the tap 24 and each of the terminals 25 and 27 at the ends of the output winding 17*a*.

In many color television receivers, as will be described in more detail later in the specification, different polarities of selected color difference signals are required to form certain color difference signals. For that reason, two or more nonlinear magnetic demodulators of the present invention may be utilized to develop the desired color difference signals.

Figure 6:
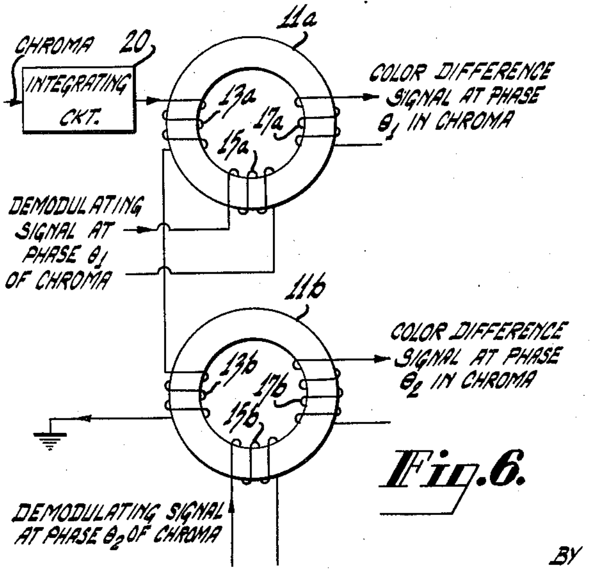

Figure 6 is a diagram of a pair of nonlinear magnetic demodulators using the high-$\mu$ iron cores 11*a* and 11*b*. The chrominance signal is integrated in the integrating circuit 20 and applied therefrom to windings on both of these high-$\mu$ iron cores, the input winding 13*a* being wound on the iron core 11*a* and the winding 13*b* being wound on the core 11*b*. Demodulating signals having phases corresponding to the phases $\theta_1$ and $\theta_2$ of the chrominance 20 signal are applied to the demodulating signal windings 15*a* and 15*b*, respectively. The output winding 17*a* thereupon produces a color difference signal corresponding to the color information at the phase $\theta_1$ in the chrominance signal and the output winding 17B produces color difference signal information at the phase $\theta_2$ in the chrominance signal.

Figure 7 is a circuit diagram of a pair of nonlinear magnetic demodulators connected to develop a trio of color difference signals. Before describing in detail the operation of the circuit of Figure 7 consider first the vector diagram of Figure 8. The vector diagram of Figure 8 relates color difference signal information in the chrominance signal to various phases of the chrominance signal. All of these phases are related to a burst or reference phase. As is seen from the vector diagram of Figure 8, the $R-Y$ and the $B-Y$ color difference signals have phases which lag the burst phase by 90° and 180°, respectively, and the $G-Y$ color difference signal has a phase which lags the phase of the $B-Y$ color difference signal by 124.2°. It is to be further noted from the vector diagram of Figure 8 that a $G-Y$ color difference signal may be formed by using proper magnitudes of the negative polarity $B-Y$ and $R-Y$ color difference signals, that is, the $-(B-Y)$ and the $-(R-Y)$ color difference signals which are located in the vector diagram at phases which are 180° out-of-phase with respect to the phases of the $B-Y$ and $R-Y$ color difference signals, respectively. The $-(B-Y)$ and $-(R-Y)$ color difference signals may therefore be demodulated from the chrominance signals at phases which are 180° out-of-phase with respect to the phases of the $B-Y$ and $R-Y$ color difference signals in the chrominance signal.

The nonlinear magnetic demodulators of Figure 7 use a pair of high-$\mu$ iron cores 11*a* and 11*b*. The chrominance signal or chroma is integrated in the integrating circuit 20 and applied therefrom to the input windings 13*a* and 13*b* of the iron cores 11*a* and 11*b*, respectively. The circuit of Figure 7 shows these input windings to be in series; the input windings of 13*a* and 13*b* may alternatively be connected in shunt. Demodulating signals having phases corresponding to the phases $\theta(R-Y)$ and $\theta(B-Y)$ in the chrominance signal are applied to the demodulating signal windings 15*a* and 15*b* of the high-$\mu$ iron cores 11*a* and 11*b*, respectively. The output winding 17*a* has a tap from an intermediate turn of the winding to ground and produces an $R-Y$ signal at the output terminal 25*a* and a $-(R-Y)$ color difference signal at the output terminal 27*a*. The output winding 17*b*, which has a tap from an intermediate turn of the winding to ground, delivers a $B-Y$ color difference signal at the output terminal 25*b* and a $-(B-Y)$ color difference signal at the output terminal 27*b*. Choice of the intermediate turns of the output windings 17*a'* and 17*b'* are connected to ground will determine the magnitude of the $-(R-Y)$ and $-(B-Y)$ color difference signals developed at the output terminals 27*a* and 27*b*. A circuit connecting terminals 27*a* and 27*b* will develop a combination of the latter-named color difference signals at the output terminal 30. By proper design of the windings 17*a'* and 17*b'* and of the location of the tapped turn of winding, which is connected to ground, a $G-Y$ color difference signal will be developed at the output terminal 30.

A nonlinear magnetic demodulator circuit of the present invention is included in the color television receiver circuit shown in Figure 9. The aforementioned nonlinear magnetic demodulator circuit includes a pair of high-$\mu$ iron cores 11*a* and 11*b* which accommodate windings which provide another means for producing color difference signals from a chrominance signal.

In the color television receiver of Figure 9, an incoming signal from a broadcast station is received by the antenna 41 and processed in the television signal receiver 43. The television signal receiver 43 utilizes a receiver type of circuit which produces a demodulated color television signal, which includes not only the luminance and chrominance signal, but also the picture deflection synchronizing signals, the color synchronizing bursts, and a frequency modulated sound carrier transmitted 4½ mc. removed from the picture carrier.

The color television signal is applied to the audio detector and amplifier 45 which uses, for example, an intercarrier sound circuit to demodulate the audio information from the frequency modulator carrier. The audio detector and amplifier 45 also amplifies the demodulated audio information which is therefrom applied to a loudspeaker 47.

The picture deflection synchronizing signals are separated from the color television signal in the deflection and high voltage circuits 49, which develop both horizontal and vertical deflection signals which are applied to the deflection yokes 51. The deflection and high voltage circuits 49 also develop a high voltage which is applied to the ultor 53 of the color kinescope 55; the deflection and high voltage circuit 49, in addition, energize a gate pulse generator 57 which develops a gate pulse 58 having a duration time substantially equal to and in time coincidence with the duration time of each color synchronizing burst on the "back porch" of the horizontal synchronizing pulses.

The color television signal and the gate pulse 58 are applied to the burst separator 61; a burst separator is a gate circuit which, responsive to the gate pulse 58, separates the color synchronizing burst from the color television signal. The separated color synchronizing bursts are thereupon applied to a burst synchronized reference signal source 63 which develops an output signal having the frequency of the bursts and a phase which is accurately synchronized to a phase prescribed by the bursts.

The burst synchronized reference signal source 63 applies the burst synchronized reference signal to the phase shift circuit 65 which develops demodulating signals of desired phase; these demodulating signals are applied respectively to the demodulating signal windings 15*a* and 15*b* of the nonlinear magnetic demodulators 12*a* and 12*b*.

The color television signal is applied to the chroma filter 67 which has a pass band at approximately 2–4.2 mc. The output of the chroma filter is the chrominance signal or chroma signal. The chrominance signal is then integrated in the integrating circuit 20. The integrated chrominance signal is applied by way of the Q filter 69 to the input winding 13*a* of the nonlinear magnetic demodulator 12*a* and by way of the delay line 71 to the input winding 13*b* of the nonlinear magnetic demodulator 12*b*. The functions of the Q filter 69 and the delay line 71 will be described later in the specification. The nonlinear magnetic demodulators 12*a* and 12*b* thereupon develop, in a manner to also be described, a trio of color difference signals, namely, $R-Y$, $B-Y$, and $G-Y$ color difference signals which are applied to amplifier circuit 73 and therefrom to the control grids of the color kinescope 55.

The color television signal, when not subjected to synchronous demodulation, constitutes principally luminance signal information. The color television signal is thereupon applied by way of the Y delay and amplifier 75 to the cathodes of the electron guns of the color kinescope 55. Each of the electron beams of the color kinescope 55 is thereupon modulated by the combination of the luminance signal with a corresponding one of the color difference signals, to provide red, green, and blue wideband component color signals in the electron beams of the color kinescope 55. It is noted that the signal combination or addition of the luminance of Y signal with each color difference signal has been caused to take place within the envelope of the color kinescope 55. It is to be appreciated that the signal addition can also be produced in signal adder circuits separate from the color kinescope 55, with the resulting component color signals thereupon applied to appropriate control electrodes of the color kinescope 55.

Figure 8:
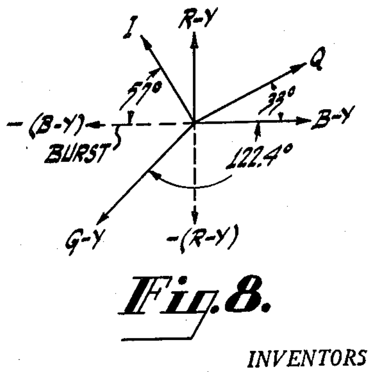
Figure 8 is a vector diagram relating various color difference signals and their respective angles in the chrominance signal.

Before describing the detailed operation of the nonlinear magnetic demodulators 12*a* and 12*b*, consider at this point a discussion of the nature of the I and Q color difference signals which are included as vectors in the vector diagram of Figure 8.

The composite color television signal includes a chrominance signal which has a frequency range of approximately 2–4.2 mc. The chrominance signal has a subcarrier frequency of 3.58 mc. It is to be noted that sideband information in the frequency range above 3.58 mc., in the chrominance signal, is limited to having modulating frequency components having a highest frequency of 0.6 mc. while lower frequency modulating components may have a modulating frequency up to 1.6 mc. in this frequency range. This disparity in upper and lower frequency ranges relative to the subcarrier frequency results from the chrominance signal including color difference signal information having a variety of frequency ranges. For example, the chrominance signal includes a so-called Q signal which describes color information along a green-purple color axis in a standard chromaticity diagram. As is shown in Figure 8, the Q signal has a phase in the chrominance signal which leads the phase of the $B-Y$ color difference signal by 33°. The chrominance signal also includes an I signal which describes color information along an orange-cyan axis in the chromaticity diagram. The phase of the I signal is such that the I and Q signals are in quadrature, with the I signal phase lagging the burst phase by 57°.

The Q signal is a narrow band color difference signal having its higher-frequency, modulating-signal components restricted to a frequency of 0.6 mc. These components are easily transmitted double sideband in the chrominance signal.

The I signal, on the other hand, has its highest-frequency, modulating-signal components in the range of 1.5 mc.; the I signal information is transmitted in the chrominance signal by transmitting I signal components double-sideband in the range from 0 to 0.6 mc.; the higher-frequency, modulating-frequency components of the I signal in the range from 0.6 to 1.5 mc. are transmitted single sideband in the chrominance signal and form that part of the chrominance signal in the frequency range between 2 and 3 mc.

The I and Q signals may be added according to prescribed magnitudes and polarities to provide $R-Y$, $B-Y$, and $G-Y$ color difference signals having a wide bandwidth from 0 to 1.5 mc. More specifically, the proportions and polarities of I and Q signal information required to make the aforementioned trio of color difference signals are stated by the following equations:

$$R-Y=.96\ I+.62\ Q \tag{16}$$

$$B-Y=-1.10\ I+1.7\ Q \tag{17}$$

$$G-Y=-.28\ I+-.64\ Q \tag{18}$$

Because the Y, I, and Q signals have different bandwidths, namely, 4.2 mc., 1.5 mc., and 0.6 mc., respectively, different amounts of time delay are required of the Y and I signals relative to the time delay inherent in the narrow band Q signal circuits in order for these signals to be produced in time coincidence at the signal combining circuits such as the color kinescope 55 and the nonlinear magnetic demodulators 12*a* and 12*b*. These time delays are furnished by the delay line 71 and the Y delay and amplifier 75.

Returning to the circuit diagram of Figure 9, it is noted therein that each of the high-$\mu$ iron cores 11*a* and 11*b* have a trio of output windings. The trio of output windings of the nonlinear magnetic demodulator 12*a* are designated as 17′A, 17′B, and 17′C, respectively; the trio of output windings of the nonlinear magnetic demodulator 12*b* are designated 17″A, 17″B, and 17″C. The direction of winding of these output windings will determine the polarities of the color difference signals produced by each of these output windings. In the paragraph to follow, it will be understood that specifying the developing of a color difference signal of one or another polarity by a winding will automatically prescribe the direction or type of connection of that winding.

The phase shift circuit 65 applies a demodulating signal having the phase corresponding to the phase of the Q signal in the chrominance signal to the demodulating signal winding 15*a* of the nonlinear magnetic demodulator 12*a*; the phase shift circuit 65 also applies a demodulating signal having the phase corresponding to the phase of the I signal in the chrominance signal to the demodulating signal winding 15*b* of the nonlinear magnetic demodulator 12*b*. The output windings 17′A and 17″A are connected in series to add together I and Q signal information according to the proportions and polarities described in Equation 16; an $R-Y$ color difference signal is therefore developed in the connector 81. The output windings 17′B and 17″B are connected in series to combine I and Q signal information according to the proportions and polarities set forth in Equation 17 to form a $B-Y$ color difference signal in the connector 83; and the output winding 17′C and the output winding 17″C are connected in series to combine proportions and polarities of I and Q information as set forth by Equation 18 to develop a $G-Y$ color difference signal in the connector 85.

The bias current source 82 is coupled in the circuit of the demodulating signal winding 15*a*; the bias current source 84 is coupled in the circuit of the demodulating signal winding 15*b*. Both bias current sources 82 and 84 apply controllable amounts of bias current through their respective windings. When demodulating signals which are a subharmonic of the chrominance signal subcarrier frequency are used, then the bias currents produced by the bias current sources 82 and 84 may be adjusted to zero. When demodulating signals having a frequency equal to or a harmonic of the chrominance signal subcarrier frequency are used, the bias current sources 82 and 84 are adjusted to provide optimum values of bias currents through their respective windings.

Figure 10 is a schematic diagram of a matrix nonlinear magnetic demodulator circuit involving the nonlinear magnetic demodulators 12*c* and 12*d*. The integrated chrominance signal is applied by way of terminal 70 to the input windings 13*c* and 13*d* which, to illustrate an alternative type of connection from the type of connection shown in Figure 7, are connected in shunt. The demodulating signals having phases related to the $R-Y$ and $B-Y$ phases in the chrominance signal are applied to the demodulating signal windings 15*c* and 15*d*, respectively. Each of the nonlinear magnetic demodulators 12*c* and 12*d* have high-$\mu$ iron cores 11*c* and 11*d*, each of which has a pair of output windings. The output winding 17'A of the nonlinear magnetic demodulator 12*c* provides an $R-Y$ color difference signal at the output terminal 91. The output winding 17'B develops a $-(R-Y)$ color difference signal. The output windings 17''A and 17''B of the nonlinear magnetic demodulator 12*d* develop $-(B-Y)$ and $B-Y$ color difference signals, respectively. The output windings 17'B and 17''A are connected in series and develop a $G-Y$ color difference signal at the output terminal 93 by combining proper magnitudes of $-(B-Y)$ and $-(R-Y)$ color difference signals.

Figure 11 is a diagram of a pair of nonlinear magnetic demodulators having only a single chrominance signal input winding which simultaneously excite two high-$\mu$ iron cores. As is shown in Figure 11, a pair of high-$\mu$ iron cores 11*f* and 11*g* are located adjacent to one another so as to provide a gap between the two high-$\mu$ iron cores. The gap isolates the two cores magnetically. A single input winding 13*f* threads both of the cores 11*f* and 11*g*. An integrated chrominance signal is applied to this input winding 13*f*; if the circuit supplying the integrated chrominance signal is a constant-current high impedance driving circuit, the fluctuations of current in the other windings of the pair of nonlinear magnetic demodulators will not cause cross talk between the two high-$\mu$ iron cores.

A demodulating signal having a phase corresponding to the phase $\theta_1$ in the chrominance signal is applied to the demodulating signal winding 13*f* and the bucking winding 15*f* which are wound on various portions of the high-$\mu$ iron core 11*f*. A demodulating signal having a phase corresponding to the phase $\theta_2$ of the chrominance signal, is applied to the demodulating signal winding 13*g* and the bucking winding 15*g* which are wound on selected portions of the high-$\mu$ iron core 11*g*. Because of the fact that the integrated chrominance signal will excite both of the iron cores 11*f* and 11*g*, a color difference signal corresponding to the phase $\theta_1$ of the chrominance signal will be developed at the output winding 17*f* of the iron core 11*f* and a color difference signal corresponding to the phase $\theta_2$ in the chrominance signal will be developed across the output winding 17*g* of the iron core 11*g*.

The nonlinear magnetic demodulators of Figures 6, 7, and 9–11 have shown a pair of nonlinear magnetic demodulators which have been matrixed or connected to produce two or more color difference signals. Those circuits shown in Figure 7 and Figures 9–12 are demodulator circuits using a pair of nonlinear magnetic demodulators which are particularly suitable for producing a trio of color difference signals. It is to be appreciated, however, that nonlinear magnetic demodulators of the present invention, connected in combinations of more than two, may be used to produce a trio of color difference signals. For example, the demodulator circuit shown in Figure 12 uses a trio of nonlinear magnetic demodulators, 12', 12'', and 12'''. Each of the nonlinear magnetic demodulators of Figure 12 has an input winding, an output winding, and a demodulating signal winding which function as previously described. The integrated chrominance signal or chroma is applied simultaneously to the input windings of each of the three nonlinear magnetic demodulators. If demodulating signals having the phases corresponding to the phases at which information relating to $R-Y$, $B-Y$, and $G-Y$ color difference signals occur in the chrominance signal are applied to the demodulating signal windings of the nonlinear magnetic demodulators 12', 12'', and 12''', respectively, then each of the aforementioned nonlinear magnetic demodulators will produce the corresponding color difference signals in their output windings.

The nonlinear magnetic demodulator circuits of Figures 5–12 have shown the chrominance signal to be integrated by an integrating circuit 20 before being applied to the nonlinear magnetic demodulators. It is to be appreciated that in alternative forms of nonlinear magnetic demodulator circuits similar to those illustrated in the above-identified figures, the nonintegrated chrominance signal may be applied directly to each of the nonlinear magnetic demodulators with each of the demodulated differentiated color difference signals provided by the nonlinear magnetic demodulators then integrated by an integrating circuit 18.

It is to be appreciated that nonlinear magnetic demodulators are not limited to magnetic demodulators of the type described above. So-called reactance tubes may be caused to operate as devices of variable inductance or capacitance and may be operated according to the invention by developing the chrominance signal across the reactance tube and varying the reactance of the reactance tube with a demodulating signal or vice versa.

*Nonlinear capacitor demodulators*

Another form of nonlinear reactance demodulator is a nonlinear capacitor demodulator which uses a ferro-electric device or material having symmetrical nonlinear reactance characteristics such as barium titinate.

A typical nonlinear capacitance demodulator circuit is shown in Figure 13*a*. This nonlinear circuit employs a nonlinear capacitance 100; this nonlinear capacitance 100 may be typically ceramic barium titinate and have a relationship between applied voltage *e* and charge Q as shown in Figure 13*b*. If the applied voltage *e* develops an electric field along what is called a ferro-electric axis in barium titinate and similar ferro-electric materials, the capacitance of the nonlinear capacitance will be caused to be a function of the magnitude of that electric field since the capacitance is the derivative of the charge Q with respect to the applied voltage.

A demodulating signal from a demodulating signal source 103 is impressed across the nonlinear capacitance 100 by way of a resistor 105. The capacitance or reactance of the nonlinear capacitance 100 will, therefore, vary at a function of time depending upon the instantaneous electric field impressed across the nonlinear capacitance 100 by the demodulating signal. The chrominance signal, applied by way of a chrominance signal source 107 and a capacitor 109 to the nonlinear capacitance 100, will be demodulated in virtue of the time variation of capacitance or reactance of the nonlinear capacitance 100. A low-pass filter 111, whose input is connected to the nonlinear capacitance 100, will thereupon develop at its output, only the color difference signal and will reject with the chrominance signal and the demodulating signal.

The nonlinear capacitance demodulating circuit of Figure 13*a* has shown the nonlinear capacitance 100 to be connected as a shunt element in the demodulator circuit. Figure 14 shows a nonlinear capacitance demodulator wherein the nonlinear capacitance 100 is used as a series element. In the circuit of Figure 14, the demodulating signal is applied to the input winding 113 of a transformer 115. The output winding 117 of the transformer 115 is connected by means of capacitors across the nonlinear capacitance 100, thereby developing an electric field corresponding to the demodulating signal, across the nonlinear capacitance 100 and changing the capacitance or reactance of the nonlinear capacitance 100 as a function of time in accordance with the variation of the demodulating signal. The chrominance signal, which is passed through the nonlinear capacitance 100 from the chrominance signal source 107 by way of the capacitor 109, will encounter a series path of varying reactance; the signal yielded by the nonlinear capacitance 100 to a load 119 will therefore be a demodulated color difference signal from the chrominance signal; this demodulated color difference signal will correspond to information occurring at the phase of the demodulating signal in the chrominance signal.

Two or more of nonlinear capacitor demodulators of the type shown in Figures 13*a* and 14 may be used for deriving a plurality of color difference signals from a chrominance signal, using a corresponding plurality of demodulating signals having phases related to the phases of the desired color difference signals in the chrominance signal.

A single crystal of ferro-electric material having a ferro-electric axis and having nonlinear capacitance or reactance characteristics may be used to develop a plurality of color difference signals or the same color difference signal at different amplitude levels.

One form of multi-signal nonlinear capacitance demodulator using a single crystal is shown in Figure 15. A ferro-electric crystal 125 of nonlinear capacitance material has several electrodes installed on its surface on various faces of the material. In one form of connection for deriving color difference signals from the ferro-electric crystal 125, the chrominance signal is applied to an electrode 127 and the demodulating signal is applied from the demodulating signal source 103 to the electrodes 129 and 131 by way of the transformer 115. These electrodes 129 and 131 are seen to be positioned on phases whereby control of the ferro-electric characteristics of the crystal is achieved. A group of output electrodes are also installed on the ferro-electric crystal 125. These output electrodes are assigned the numerals 133, 135, and 137; each of the output electrodes 133, 135, and 137 are resistively connected to ground and coupled to drive the low-pass filters 140*a*, 140*b*, and 140*c*, respectively. By cutting the ferro-electric crystal to have the ferro-electric axis of the crystal 125 along an axis passing through the electrode 137 and the output electrode 135, a color difference signal of greatest amplitude, having a phase corresponding to the phase of the demodulating signal in the chrominance signal, will be developed at the output terminal 135. The output electrodes 133 and 137, being positioned off the ferro-electric axis will produce the demodulating color difference signal at reduced amplitude levels which are dependent not only upon the precise angle at which these electrodes are positioned off the ferro-electric axis but also on the area of each of the electrodes.

The nonlinear capacitance demodulator of Figure 15 may be driven in an alternative fashion by applying, for example, demodulating signals of different phases between the terminals 129 and 131, respectively, and another electrode installed on the face of the device. Combinations of color difference signal information related to the phases of each of these demodulating signals in the chrominance signal and having amplitudes dependent upon the areas of the output electrodes 133, 135, and 137 and the positions of these latter-mentioned output electrodes will be developed therefrom.

Color difference signal demodulators of the nonlinear capacitance variety may be matrixed to produce a required plurality of color difference signals from a chrominance signal or may be used as a group, each operating independently to produce a prescribed and different color difference signal. A color television receiver adapted to use a trio of nonlinear capacitance demodulators of the present invention to produce $R-Y$, $B-Y$, and $G-Y$ color difference signals is shown in Figure 16.

In the color television receiver circuit of Figure 16, circuits which have the same functions as those described in connection with the color television receiver of Figure 9 have been assigned the same numeral.

The color television receiver circuit of Figure 16 includes a trio of nonlinear capacitance demodulators, using the nonlinear capacitances 151, 153, and 155, in a circuit which is included in the dash-line box 157. The chrominance signal is applied from the chroma filter 159, which separates the chrominance signal from the color television signal to the resonant circuit 161. The resonant circuit 161 has a bandwidth commensurate with the bandwidth of the chrominance signal; the chrominance signal is applied from the resonant circuit 161 simultaneously to each of the nonlinear capacitances 151, 153, and 155.

The phase shift circuit 161, to which is applied a reference signal from the burst-synchronized reference signal source 63, applies an $R-Y$ phase demodulating signal, denoted as $\theta(R-Y)$, across the nonlinear capacitance 151. The phase shift circuit 161 also develops demodulating signals having the phases of the $B-Y$ and $G-Y$ color difference signals in the chrominance signal; these demodulating signals, which are denoted as $\theta(B-Y)$ and $\theta G-Y)$, respectively, are developed across the nonlinear capacitances 153 and 155, respectively. The reactance or capacitance properties of the nonlinear capacitances 151, 153, and 155 are each thereupon caused to vary with time, responsive to the corresponding applied demodulating signal, and the mixing of the chrominance signal and the corresponding demodulating signal across each nonlinear capacitance will result in the color difference signal information at the demodulating signal phase in the chrominance signal, being produced across an output load consisting of a resistor and a condenser. The nonlinear capacitances 151, 153, and 155 are connected to the output loads 171, 173, and 175, respectively.

The $R-Y$, $B-Y$, and $G-Y$ color difference signals, which are developed across the output loads 171, 173, and 175 are thereupon applied by way of low-pass filters and amplifiers 180*a*, 180*b*, and 180*c*, respectively, to corresponding control electrodes of the color kinescope 55.

The nonlinear capacitance demodulators included in the dash-line box 157 of Figure 16 function as shunt devices corresponding to the nonlinear capacitance demodulator described in Figure 12. It is to be appreciated that series-connected nonlinear capacitance demodulators of the type shown in Figure 14 may also be employed therein.

*Harmonic and subharmonic reference signal sources*

Harmonic and subharmonic frequency reference signal sources which are burst synchronized are circuits which are auxiliary to the nonlinear reactance demodulators of the invention. In order that circuits for practicing the invention will be more completely understood, typical reference signal sources will be discussed as follows:

One form of burst-synchronized reference signal source 63 is shown in Figure 17 in schematic form to illustrate a preferred, though not definitive circuit for producing a harmonic or subharmonic burst-synchronized reference signal in a color television receiver.

The separated bursts, representing 3.58 mcs. reference-phase information and presented at the terminal 62 are applied simultaneously to the cathode of diode 271 and to the anode of diode 273 of the phase comparator 270. An oscillator 274, involving a tube 275, a grid resonant circuit 277, and a feedback system from screen grid to control grid using the piezoelectric crystal 279, develops reference signal oscillations at the harmonic or subharmonic frequency. The grid resonant circuit 277 and the piezoelectric crystal 279 are resonant at the reference signal frequency. A resonant circuit 281, coupled to the anode of tube 275, is also resonant at the reference signal frequency and responsive to the reference signal frequency oscillations produced in the electron stream of tube 275, develops oscillations at the reference signal frequency.

A pair of 180° out-of-phase reference signals are derived from the resonant circuit 281. One reference signal, derived directly from a winding of the inductance 283 of the resonant circuit 281, is applied by way of condenser 285 to the anode of diode 271. A winding 287, inductively coupled to the inductance 283, applies a 180° out-of-phase reference signal, relative to the phase of reference signal applied to the anode of diode 271, to the cathode of diode 273 by way of condenser 289. A resistance network 291 and an integrating circuit 293 are connected from the anode of diode 271 and the cathode of diode 273 to ground. The 3.58 mcs. bursts and the reference signal oscillations are thereupon mixed and compared in the diodes 271 and 273 and a continuous voltage is developed across the integrating circuit 293; this voltage is a control voltage which is indicative of the phase relationship between the phases of the bursts and the phase of the reference signal oscillations developed in tube 275 regardless of whether the reference signal oscillations are at a harmonic or a subharmonic of the burst frequency.

The control signal developed across integrating circuit 293 is applied by way of the inductance 295 and the resistance 297 to the control grid of the reactance tube 299 which is coupled in shunt with the grid resonant circuit 277 of the tube 275. The reactance tube 299, responsive to the control voltage developed across the integrating circuit 293, thereupon controls the frequency and phase of the reference signal oscillations developed in the grid resonator 277 and therefore in the resonant circuit 81 and at the output terminal 64.

An alternative circuit for producing a subharmonic frequency reference signal is illustrated in the circuit of Figure 18 which uses a phase-locked 3.58 mc. signal source 311 which is phase synchronized by the separated bursts which are applied thereto from the terminal 62. The output signal of the phase-locked 3.58 mc. signal source 311 is an oscillatory signal having the frequency of the separated bursts. The oscillatory signal is thereupon applied to the frequency divider 313 which produces the desired Nth subharmonic wave having a frequency $3.58/N$; this subharmonic wave is also phase synchronized by the separated bursts. The Nth subharmonic wave is thereupon applied to the output terminal 64.

Having described the invention, what is claimed is:

1. In combination, a nonlinear reactance device having controllable reactance, a source of a color subcarrier including a plurality of color information signals each occurring at a prescribed phase of said color subcarrier, means to vary the reactance of said nonlinear reactance device at a phase related to a selected phase of said carrier, and means to apply said color subcarrier to said nonlinear reactance device to therefrom demodulate a color information signal occurring at the phase in said color subcarrier at which said nonlinear reactance device is varied.

2. In combination: a nonlinear inductance device having controllable inductance, a source of color subcarrier including a plurality of color information signals each occurring at a prescribed phase of said color subcarrier, means to vary the inductance of said nonlinear inductance device at a phase related to a selected phase of said carrier, and means to apply said color subcarrier to said nonlinear inductance device to therefrom demodulate a color information signal corresponding to said selected phase of said color subcarrier.

3. In combination: a nonlinear capacitance device having controllable capacitance, a source of a color subcarrier including a plurality of color information signals each occurring at a prescribed phase of said color subcarrier, means to vary the reactance of said nonlinear reactance device at a phase related to a selected phase of said carrier, and means to apply said color subcarrier to said nonlinear capacitance device to therefrom demodulate a color information signal corresponding to said selected phase of said color subcarrier.

4. In combination: a nonlinear reactance device having a reactance controllable by an applied signal, a source of a color subcarrier including the color information signal capable of being demodulated by synchronous detection at a prescribed phase of said color subcarrier, means to develop a demodulating signal having a phase related to the phase at which said color information signal occurs in said color subcarrier, and means to apply said color subcarrier and said demodulating signal to said nonlinear reactance to cause synchronous detection of said color information signal.

5. In combination: a controllable-coupling transformer device having a coupling controllable by an applied signal, a source of a color subcarrier including the color information signal capable of being demodulated by synchronous demodulation at a prescribed phase of said color subcarrier, means to develop a synchronous demodulating signal having a phase related to the phase of said color information signal in said color subcarrier, and means to apply said color subcarrier and said synchronous demodulating signal to said controllable-coupling transformer to cause said coupling to vary in accordance with said demodulating signal and to thereby cause synchronous demodulation of said color information signal.

6. In combination: a nonlinear capacitance device having a capacitance controllable by an applied signal, a source of a color subcarrier including the color information signal capable of being demodulated by synchronous detection at a prescribed phase of said color subcarrier, means to develop a demodulating signal having a phase related to the phase at which said color information signal occurs in said color subcarrier, and means to apply said color subcarrier and said demodulating signal to said nonlinear capacitance to control the capacitance in accordance with said demodulating signal and to cause synchronous detection of said color information signal.

7. In a color television receiver adapted to receive a color television signal including a color information subcarrier, said color information subcarrier including a plurality of color information signals, each occurring at a prescribed phase of said color information subcarrier, said color television signal also including color synchronizing bursts having a reference phase with respect to the phases of said color information signals in said color information subcarrier, a demodulator comprising in combination: a nonlinear magnetic device capable of having its permeability controllable, means responsive to said bursts to control the permeability of said nonlinear inductance at a phase related to a predetermined phase of said color information subcarrier, and means to apply said color information subcarrier to said nonlinear magnetic device, and means to derive from said nonlinear magnetic device a color difference signal corresponding to the color information signal occurring in the color information subcarrier at the phase of the variation of the permeability.

8. In a color television receiver adapted to receive a color television signal including a chrominance signal, said chrominance signal including a plurality of color difference signals, each occurring at a prescribed phase of said chrominance signal, said color television signal also including color synchronizing bursts having a reference phase with respect to the phases of said color difference signals in said chrominance signal, a demodulator comprising in combination: a nonlinear capacitance having a controllable capacitance, means cotrolled by said bursts to vary the capacitance of said nonlinear capacitance at a prescribed phase of said chrominance signal, and means to develop said chrominance signal across said nonlinear capacitance to develop therefrom a color difference signal having a phase in the chrominance signal corresponding to the phase of variation of the capacitance of said nonlinear capacitance.

9. In combination: a nonlinear reactance device having a reactance capable of being varied in accordance with an applied control signal, a circuit to provide a modulated subcarrier having a subcarrier frequency and including a plurality of different color information signals each occurring at a prescribed phase of said modulated subcarrier and each capable of being demodulated by mixing said modulated subcarrier with a periodically varying demodulating signal having a frequency harmonically related to subcarrier frequency and having a phase related to the phase of a prescribed color difference signal in said modulated subcarrier, means to develop a demodulating signal having a frequency harmonically related to said subcarrier frequency and having a phase related to the phase of said prescribed color information signal in said modulated subcarrier, and means to apply said modulated subcarrier and said demodulating signal to said nonlinear reactance to cause the reactance to vary in accordance with said demodulating signal and to therein mix said modulated subcarrier with said demodulating signal to develop said prescribed color information signal.

10. In combination: a nonlinear magnetic device having a permeability capable of being varied as a function of an applied control signal, a circuit to provide a modulated subcarrier having a subcarrier frequency and including a plurality of different color information signals each occurring at a prescribed phase of said modulated subcarrier and each capable of being demodulated by mixing said modulated subcarrier with a periodically varying demodulating signal having a frequency harmonically related to subcarrier frequency and having a phase related to the phase of a prescribed color difference signal in said modulated subcarrier, means to develop a demodulating signal having a frequency harmonically related to said subcarrier frequency and having a phase related to the phase of said prescribed color information signal in said modulated subcarrier, and electrical winding means to apply said modulated subcarrier and said demodulating signal to said nonlinear magnetic device to cause the permeability of said device to vary in accordance with said demodulating signal and to therein mix said modulated subcarrier and said demodulating signal to develop said prescribed color information signal.

11. In a color television receiver adapted to receive a color television signal including a chrominance signal and also color synchronizing bursts, said chrominance signal having a frequency and also including modulations representing a plurality of color difference signals, each of said modulations occurring at a prescribed phase of said chrominance signal, said color synchronizing bursts having said chrominance signal frequency and having a reference phase relative to the phases of the modulations contained in said chrominance signal, a demodulator comprising in combination: a magnetic core having a plurality of windings and having a permeability which is a function of current passed through one of said windings, means responsive to said color synchronizing bursts to develop a demodulating signal having a phase related to a phase of said chrominance signal corresponding to modulations representative of a color difference signal occurring at that phase, means coupled to said demodulating signal developing means to pass current through one of said plurality of windings of said iron core to vary the permeability of said iron core at a phase related to the phase of said demodulating signal, means to develop an integrated chrominance signal, means to apply said integrated chrominance signal to another of said plurality of windings of said iron core whereby said color difference signal is produced in a third of said plurality of windings.

12. In a color television receiver adapted to receive a color television signal including a chrominance signal and also color synchronizing bursts, said chrominance signal having a frequency and also including modulations representing a plurality of color difference signals, each of said modulations occurring at a prescribed phase of said chrominance signal, said color synchronizing bursts having said chrominance signal frequency and having a reference phase relative to the phases of the modulations contained in said chrominance signal, a demodulator comprising in combination: a magnetic core having a plurality of windings and having a permeability which is a function of current passed through one of said windings, means responsive to said color synchronizing bursts to develop a demodulating signal having a phase related to a phase of said chrominance signal corresponding to modulations representative of a color difference signal occurring at that phase, means coupled to said demodulating signal developing means to pass current to one of said plurality of windings of said iron core to vary the permeability of said iron core at a phase of frequency of said demodulating signal, means to apply said chrominance signal to another of said plurality of windings of said iron core to cause demodulated information corresponding to the differentiation of said color difference signal to be produced in a third of said plurality of windings and integrating circuit means coupled to said third of said plurality of windings to integrate said demodulated information.

13. In a color television receiver adapted to receive a color television signal including a chrominance signal and also color synchronizing bursts, said chrominance signal having a frequency and also including modulations representing a plurality of color difference signals, each of said modulations occurring at a prescribed phase of said chrominance signal, said color synchronizing bursts having said chrominance signal frequency and having a reference phase relative to the phases of the modulations contained in said chrominance signal, a demodulator comprising in combination: a magnetic core having a plurality of windings, the permeability of said iron core capable of being controlled responsive to a current passed through a first of said plurality of said windings, means to derive from said bursts a demodulating signal having a phase related to a prescribed phase of said chrominance signal at which a modulation representative of a color difference signal to be demodulated occurs, means coupled to said demodulating signal developing means to apply said demodulating signal to said first of said plurality of windings, means to integrate said chrominance signal, means to apply said integrated chrominance signal to a second of said plurality of windings, and means to derive from each of a group of others of said plurality of windings different amplitudes and polarities of said prescribed color difference signal.

14. In combination: a source of a color subcarrier having each of a plurality of color information signals to be demodulated at a prescribed phase of said color subcarrier, a magnetic core having a plurality of windings, said magnetic core providing controllable transmission between a first and a second of said plurality of windings according to the magnitude of current passed through a third of said windings, means to apply said color subcarrier to a first of said plurality of windings, means to develop a demodulating signal having a phase related to a prescribed phase of said color subcarrier, means to couple said demodulating signal to the third of said plurality of windings to vary the transmission between said first and second winding at said phase of said demodulating signal, and means to apply said color subcarrier to the first of said plurality of windings whereby a color information signal corresponding to said prescribed phase of said color subcarrier is developed in said third winding.

15. In a color television receiver adapted to receive a color television signal including a chrominance signal and also color synchronizing bursts, said chrominance signal having a frequency and also including modulations representing a plurality of color difference signals, each of said modulations occurring at a prescribed phase of said chrominance signal, said color synchronizing bursts having said chrominance signal frequency and having a reference phase relative to the phases of the modulations contained in said chrominance signal, a demodulator comprising in combination: a first and second magnetic core each having a plurality of windings including a demodulating signal winding and each capable of causing variable transmission between an input winding and output windings responsive to current applied to said demodulating signal winding, means to apply signal information related to said chrominance signal to the input windings of both said first and second iron cores, means to derive from said bursts a first and second demodulating signal having phases related to a first and second phase of said chrominance signal, respectively, the color difference signal information represented by the modulations in said chrominance signal at said first and second phases being capable of being combined to produce a desired color difference signal corresponding to color difference signal information represented by modulations at a third phase of said chrominance signal, means to apply said first demodulating signal to the demodulating signal winding of said first magnetic core, means to apply said second demodulating signal to the demodulating signal winding of said second magnetic core, and means to operatively connect output windings of said first and second iron cores to produce color information related to said color difference signal corresponding to said third phase of said chrominance signal.

16. In a color television receiver adapted to receive a color television signal including a chrominance signal and also color synchronizing bursts, said chrominance signal having a frequency and also including modulations representing a plurality of color difference signals, each of said modulations occurring at a prescribed phase of said chrominance signal, said color synchronizing bursts having said chrominance signal frequency and having a reference phase relative to the phases of the modulations contained in said chrominance signal, a demodulator comprising in combination: a first and second magnetic core each having a plurality of windings including a demodulating signal winding and each capable of causing variable transmission between an input winding and output windings responsive to current applied to said demodulating signal winding, means to integrate said chrominance signal, means to apply said integrated chrominance signal to the input windings of both said first and second iron cores, and means to derive from said bursts a first and second demodulating signal having phases related to a first and second phase of said chrominance signal, respectively, the color difference signal information represented by the modulations in said chrominance signal at said first and second phases being capable of being combined to produce a desired color difference signal corresponding to color difference signal information represented by modulations at a third phase of said chrominance signal, means to apply said first demodulating signal to the demodulating signal winding of said first magnetic core, means to apply said second demodulating signal to the demodulating signal winding of said second magnetic core, and means to combine output windings of said first and second iron cores to produce said color difference signal corresponding to said third phase of said chrominance signal.

17. In a color television receiver adapted to receive a color television signal including a chrominance signal and color synchronizing bursts, said chrominance signal including modulations representative of each of said plurality of color difference signals at a phase of said chrominance signal, said color synchronizing bursts having the frequency and a reference phase of said chrominance signal, a color difference signal demodulator comprising in combination: a magnetic core having a plurality of windings and capable of varying the transmission between a first and a second of said windings responsive to a control current passed through a third of said windings, said second of said windings having a tap at an intermediate turn of said second windings, means to apply signal information related to said chrominance signal to the first of said windings, and means to derive from said color synchronizing bursts a demodulating signal having a frequency related to the frequency of said chrominance signal and also a phase related to the phase wherein modulations representative of a prescribed color difference signal occur in said chrominance signal, means to apply a current varying according to said demodulating signal to the third of said windings to cause said second winding to develop a first and second polarity of color information related to said prescribed color difference signal relative to said tap on the intermediate turn.

18. In a color television receiver adapted to receive a color television signal including a chrominance signal and color synchronizing bursts, said chrominance signal including modulations representative of each of said plurality of color difference signals at a phase of said chrominance signal, said color synchronizing bursts having the frequency and a reference phase of said chrominance signal, a color difference signal demodulator comprising in combination: an iron core having a plurality of windings and capable of varying the flux linkage between a first and a second of said windings responsive to a control current passed through a third of said windings, said second of said windings having a tap at an intermediate turn of said second winding, means to integrate said chrominance signal, means to apply said integrated chrominance signal to the first of said windings, and means to derive from said color synchronizing bursts a demodulating signal having a frequency related to the frequency of said chrominance signal and also a phase related to the phase at which modulations representative of a prescribed color difference signal occur in said chrominance signal, means to apply a current varying according to said demodulating signal to the third of said windings to cause said second winding to develop a first and second polarity of said described color difference signal relative to said tap on the intermediate turn.

19. In a color television receiver adapted to receive a color television signal including a chrominance signal and color synchronizing bursts, said chrominance signal including modulations representative of each of said plurality of color difference signals at a phase of said chrominance signal, said color synchronizing bursts having the frequency and a reference phase of said chrominance signal, a color difference signal demodulator comprising in combination: an iron core having a plurality of windings and capable of having the permeability of said iron core controlled in response to a current passed through a first of said windings, means to apply signal information related to said chrominance signal to a second of said windings, means to derive from said color synchronizing bursts a demodulated signal having a frequency related to the frequency of said chrominance signal and having a prescribed phase related to a phase of said chrominance signal at which modulations representative of a color difference signal occur, means to apply said demodulating signal to a first of said windings in one phase and magnitude and to a third of said windings in a second phase and magnitude to cause color information related to said color difference signal to be developed in a fourth of said windings and to prevent information related to said demodulating signal from being developed in either said first or said fourth of said windings, and a means to utilize said color information coupled to said fourth winding.

20. In a color television receiver adapted to receive a color television signal including a chrominance signal and color synchronizing bursts, said chrominance signal including modulations representative of a pair of color difference signals occurring at a first and second phase of said chrominance signal, each of said pair of color difference signals capable of being combined in prescribed amplitudes and polarities to produce other color difference signals, said color synchronizing bursts having a frequency of said chrominance signal and having a reference phase relative to said first and second phases of said chrominance signal, a color demodulator comprising in combination: a first and second magnetic core each having a color information signal input winding, a demodulating signal winding, and a plurality of output windings, means to apply a color information signal related to said chrominance signal to the color information signal input windings of both said first and second magnetic cores, means to derive from said color synchronizing bursts a first and second demodulating signal having phases related to the first and second phases, respectively, of said chrominance signal, means to apply said first and second demodulating signals to the demodulating signal windings of said first and second magnetic cores, respectively, and means to couple selected output windings of both said first and second iron cores to develop different signals each related to one of a prescribed group of color difference signals.

21. In a color television receiver adapted to receive a color television signal including a chrominance signal and color synchronizing bursts, said chrominance signal including modulations representative of a pair of color difference signals occurring at a first and second phase of said chrominance signal, said pair of color difference signals capable of being combined in prescribed amplitudes and polarities to produce a third and different color difference signal, said color synchronizing bursts having a frequency of said chrominance signal and having a reference phase relative to said first and second phases of said chrominance signal, a color demodulator comprising in combination: a first and second magnetic core each having a color signal input winding, a demodulator signal winding, and a plurality of output windings, means to apply a color signal related to said chrominance signal to the color signal input windings of both said first and second iron cores, means to derive from said color synchronizing bursts a first and second demodulating signal having phases related to the first and second phases, respectively, of said chrominance signal, means to apply said first and second demodulating signals to the demodulating signal windings of said first and second magnetic cores, respectively, and means to couple selected output windings of both said first and second magnetic cores to develop a signal related to said third color difference signal and to develop signals related to said pair of color difference signals at other output windings of said first and second magnetic cores.

22. In a color television receiver adapted to receive a color television signal including a chrominance signal and color synchronizing bursts, said chrominance signal including modulations representative of a trio of color difference signals occurring at a first, second, and third phase of said chrominance signal, said color synchronizing bursts having a frequency of said chrominance signal and having a reference phase relative to said first and second phases of said chrominance signal, a color demodulator comprising in combination: a first, second, and third magnetic core each having a color signal input winding, a demodulator signal winding, and an output winding, means to apply a color signal related to said chrominance signal to the color signal input windings of said first, second, and third magnetic cores, means to derive from said color synchronizing bursts a first, second, and third demodulating signal having phases related to the first, second, and third phases, respectively, of said chrominance signal, means to apply said first, second, and third demodulating signals to the demodulating signal windings of said first, second, and third magnetic cores, respectively, to develop signals related to said first, second, and third color difference signals in the corresponding output windings of said first, second, and third magnetic cores.

23. In combination: a circuit to provide a chrominance signal including information relating to a color difference signal which occurs at a prescribed phase of said chrominance signal, integrating circuit means coupled to said chrominance signal providing circuit to develop an integrated chrominance signal, means to develop a periodic wave having a phase related to the phase at which said color information signal occurs in said chrominance signal, an iron core having a plurality of windings and having a permeability controllable by at least a current passed through a first of said windings, means to apply said periodic wave to said first winding to control the permeability of said iron core at said phase of said chrominance signal, means to apply said integrated chrominance signal to a second of said windings to cause said color information signal to be developed in at least a third of said plurality of windings.

24. In combination: a circuit to provide a chrominance signal including information relating to a color difference signal at a prescribed phase of said chrominance signal, integrating circuit means coupled to said chrominance signal providing circuit to develop an integrated chrominance signal, means to develop a periodic wave having a phase related to the phase of said color information signal in said chrominance signal, a magnetic device having a plurality of windings and having the flux in said magnetic device controllable by at least a current passed through a first of said windings, means to apply said periodic wave to said first winding to control the flux in said magnetic device at said phase of said chrominance signal, means to apply said integrated chrominance signal to a second of said windings to cause said color information signal to be developed in at least a third of said plurality of windings.

25. In combination: a circuit to provide a chrominance signal having a color information signal occurring in said chrominance signal at a prescribed phase, means to develop a periodic wave having a phase related to said prescribed phase of said chrominance signal, a high-$\mu$ iron core having a plurality of windings and capable of having its permeability varied by current passed through a first of said plurality of windings, means to apply said periodic wave through said first of said windings to vary the permeability of said iron core at the said phase of said demodulating signal, means to apply said chrominance signal to a second of said plurality of windings to cause a differentiated color information signal corresponding to said color information signal occurring at said prescribed phase in said chrominance signal to be developed in at least a third of said plurality of windings, an integrating circuit means coupled to said third winding of said plurality of windings to integrate said differentiated color information signal.

26. In combination: a circuit to provide a chrominance signal having a color information signal occurring in said chrominance signal at a prescribed phase, means to develop a periodic wave having a phase related to said prescribed phase of said chrominance signal, a magnetic device having a plurality of windings and capable of having flux varied by current passed through a first of said plurality of windings, means to apply said periodic wave through said first of said windings to vary the flux through said magnetic device at the said phase of said demodulating signal, means to apply said chrominance signal to a second of said plurality of windings to cause a differentiated color information signal corresponding to said color information signal occurring at said prescribed phase in said chrominance signal to be developed in at least a third of said plurality of windings, an integrating circuit means coupled to said third winding of said plurality of windings to integrate said differentiated color information signal.

27. In a color television receiver adapted to receive a color television signal including both a chrominance signal and color synchronizing bursts, said chrominance signal including modulations representative of a plurality of color difference signals each occurring at a selected phase of said chrominance signal, said chrominance signal having a frequency, said color synchronizing bursts having said chrominance signal frequency and also having a reference phase relative to the phases of the modulations included in the chrominance signal, a color demodulator circuit comprising the combination of: a nonlinear capacitance device having a plurality of electrodes installed on various portions of said nonlinear capacitance device and capable of having voltages applied to selected electrodes to control the capacitance of the nonlinear capacitance device, means to apply said chrominance signals to at least one of said control electrodes, means to derive from said color synchronizing bursts a plurality of color difference signals having different phases of said chrominance signals at which color difference signal information occurs, means to apply each of said plurality of demodulating signals to selected electrodes of said nonlinear capacitance device, and means to derive from others of said electrodes prescribed color difference signals related to modulations occurring in the chrominance signal at the phases of the demodulating signals applied thereto.

28. In a color television receiver adapted to receive a color television signal including both a chrominance signal and color synchronizing bursts, said chrominance signal including modulations representative of a plurality of color difference signals each occurring at a selected phase of said chrominance signal, said chrominance signal having a frequency, said color synchronizing bursts having said chrominance signal frequency and also having a reference phase relative to the phases of the modulations included in the chrominance signal, a color demodulator circuit comprising the combination of: a plurality of nonlinear capacitances each capable of being varied in capacitance in accordance with a varying applied voltage, means for applying said chrominance signal to each of said nonlinear capacitances, means to derive from said color synchronizing bursts a plurality of demodulating signals each having a phase of said chrominance signal corresponding to a desired color difference signal to be demodulated from said chrominance signal, means coupled to said demodulating signal developing means and coupled to each of said nonlinear capacitances responsive to said demodulating signals to vary the capacitance of each of said nonlinear capacitances at a phase corresponding to the phase of one of a plurality of desired color difference signals to be demodulated from said chrominance signal to develop therefrom said plurality of desired color difference signals.

References Cited in the file of this patent

Design Techniques Electronics, pages 136 to 143, February 1954.